(12) United States Patent
Yagi

(10) Patent No.: US 11,095,779 B2
(45) Date of Patent: Aug. 17, 2021

(54) DATA PROCESSING SYSTEM, CONTROL METHOD FOR DATA PROCESSING SYSTEM, AND STORAGE MEDIUM FOR DISPLAYING AN OBJECT BASED ON CLOUD SERVICE PERMISSION SETTING

(71) Applicant: CANON KABUSHIKI KAISHA, Tokyo (JP)

(72) Inventor: Yuichi Yagi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/692,922

(22) Filed: Nov. 22, 2019

(65) Prior Publication Data

US 2020/0177740 A1 Jun. 4, 2020

(30) Foreign Application Priority Data

Nov. 29, 2018 (JP) .............................. JP2018-224132

(51) Int. Cl.
*G06F 3/12* (2006.01)
*H04N 1/00* (2006.01)

(52) U.S. Cl.
CPC ..... *H04N 1/00206* (2013.01); *H04N 1/00212* (2013.01); *H04N 1/00241* (2013.01); *H04N 1/00474* (2013.01)

(58) Field of Classification Search
None
See application file for complete search history.

(56) References Cited

U.S. PATENT DOCUMENTS

| | | | |
|---|---|---|---|
| 9,035,958 B2 | 5/2015 | Gopalasamy | |
| 10,162,584 B1* | 12/2018 | Ozawa | G06F 3/1288 |
| 2013/0342866 A1 | 12/2013 | Hansen | |
| 2014/0122349 A1* | 5/2014 | Takatsu | G06Q 30/018 |
| | | | 705/317 |
| 2014/0240761 A1 | 8/2014 | Nagai | |
| 2014/0365655 A1* | 12/2014 | Takahashi | H04L 67/10 |
| | | | 709/225 |
| 2015/0015908 A1* | 1/2015 | Tanaka | H04N 1/4413 |
| | | | 358/1.14 |
| 2015/0046976 A1 | 2/2015 | Tonegawa | |
| 2016/0072967 A1* | 3/2016 | Yoshimura | G06F 3/1204 |
| | | | 358/1.15 |
| 2017/0180570 A1* | 6/2017 | Hirasawa | H04N 1/32625 |
| 2018/0139355 A1* | 5/2018 | Watanabe | H04N 1/00344 |

(Continued)

*Primary Examiner* — Henok Shiferaw
(74) *Attorney, Agent, or Firm* — Canon U.S.A., Inc, IP Division

(57) ABSTRACT

There is provided a control method for a data processing system, the control method including: registering connection destination information for accessing a cloud service; storing in a storage unit, for each user, information indicating whether or not to allow use of the cloud service; authenticating a user; determining, on the basis of the information stored in the storage unit, whether or not the user authenticated in the authenticating is allowed to use the cloud service; and displaying no object for transmitting data to the cloud service by using the connection destination information when the user is determined in the determining to not be allowed to use the cloud service, and displaying an object for transmitting data to the cloud service by using the connection destination information when the user is determined in the determining to be allowed to use the cloud service.

10 Claims, 9 Drawing Sheets

(56) References Cited

U.S. PATENT DOCUMENTS

2018/0253268 A1* 9/2018 Tonegawa ............ H04N 1/0035
2019/0327379 A1* 10/2019 Kim ................... H04N 1/00212
2020/0310714 A1* 10/2020 Koike .................. G06F 3/1222

* cited by examiner

FIG. 4

| USER ID | USER NAME | PASSWORD | CLOUD SERVICE A | USER ID FOR A | PASSWORD FOR A | CLOUD SERVICE B | USER ID FOR B | PASSWORD FOR B | CLOUD SERVICE C | USER ID FOR C | PASSWORD FOR C |
|---|---|---|---|---|---|---|---|---|---|---|---|
| 1 | 123456789 | USER A | xxxx | APPROVE | 5555 | aaaa | NON-REGISTERED | 7777 | cccc | REJECT | 9999 | eeee |
| 2 | 111122223 | USER B | yyyy | REJECT | 6666 | bbbb | APPROVE | 8888 | dddd | REJECT | 8899 | ffff |

400

DATA PROCESSING SYSTEM, CONTROL METHOD FOR DATA PROCESSING SYSTEM, AND STORAGE MEDIUM FOR DISPLAYING AN OBJECT BASED ON CLOUD SERVICE PERMISSION SETTING

BACKGROUND OF THE INVENTION

Field of the Invention

The present invention relates to a data processing system, a control method for a data processing system, and a storage medium.

Description of the Related Art

A service called a cloud service is available. In this service, for example, a server on a network performs various types of information processing including data saving in place of a data processing apparatus.

U.S. Pat. No. 9,035,958 describes a technique in which a data processing apparatus transmits a scanned image to a server and the server transmits data to an original destination.

There may be a form in which an object for transmitting data to a cloud service is displayed, and the data is transmitted to the cloud service when the displayed object is selected.

However, as the number of displayed objects increases, it becomes more difficult for the user to select a cloud service that the user wants to use, which is a problem. Further, the user may accidentally select an unintended cloud service.

U.S. Pat. No. 9,035,958 describes only the use of the server on a network and does not assume a case where the number of displayed objects increases.

SUMMARY OF THE INVENTION

The present invention provides a data processing system including a registration unit, a storage unit, an authentication unit, a determination unit, and a display unit. The registration unit is configured to register connection destination information for accessing a cloud service. The storage unit is configured to store, for each user, information indicating whether or not to allow use of the cloud service. The authentication unit is configured to authenticate a user. The determination unit is configured to determine, on the basis of the information stored in the storage unit, whether or not the user authenticated by the authentication unit is allowed to use the cloud service. The display unit is configured to display no object for transmitting data to the cloud service by using the connection destination information when the determination unit determines that the user is not allowed to use the cloud service, and to display an object for transmitting data to the cloud service by using the connection destination information when the determination unit determines that the user is allowed to use the cloud service.

Further features of the present invention will become apparent from the following description of exemplary embodiments with reference to the attached drawings.

BRIEF DESCRIPTION OF THE DRAWINGS

FIG. 4 is a diagram illustrating transmission destination information that is transmitted to the image forming apparatus from an authentication server of this embodiment.

DESCRIPTION OF THE EMBODIMENTS

Hereinafter, an embodiment of the present invention will be described in detail with reference to the drawings. Note that the embodiment described below is not intended to limit the invention stated in the appended claims, and all combinations of features described in the embodiment are not essential to the present invention.

Figure 1:
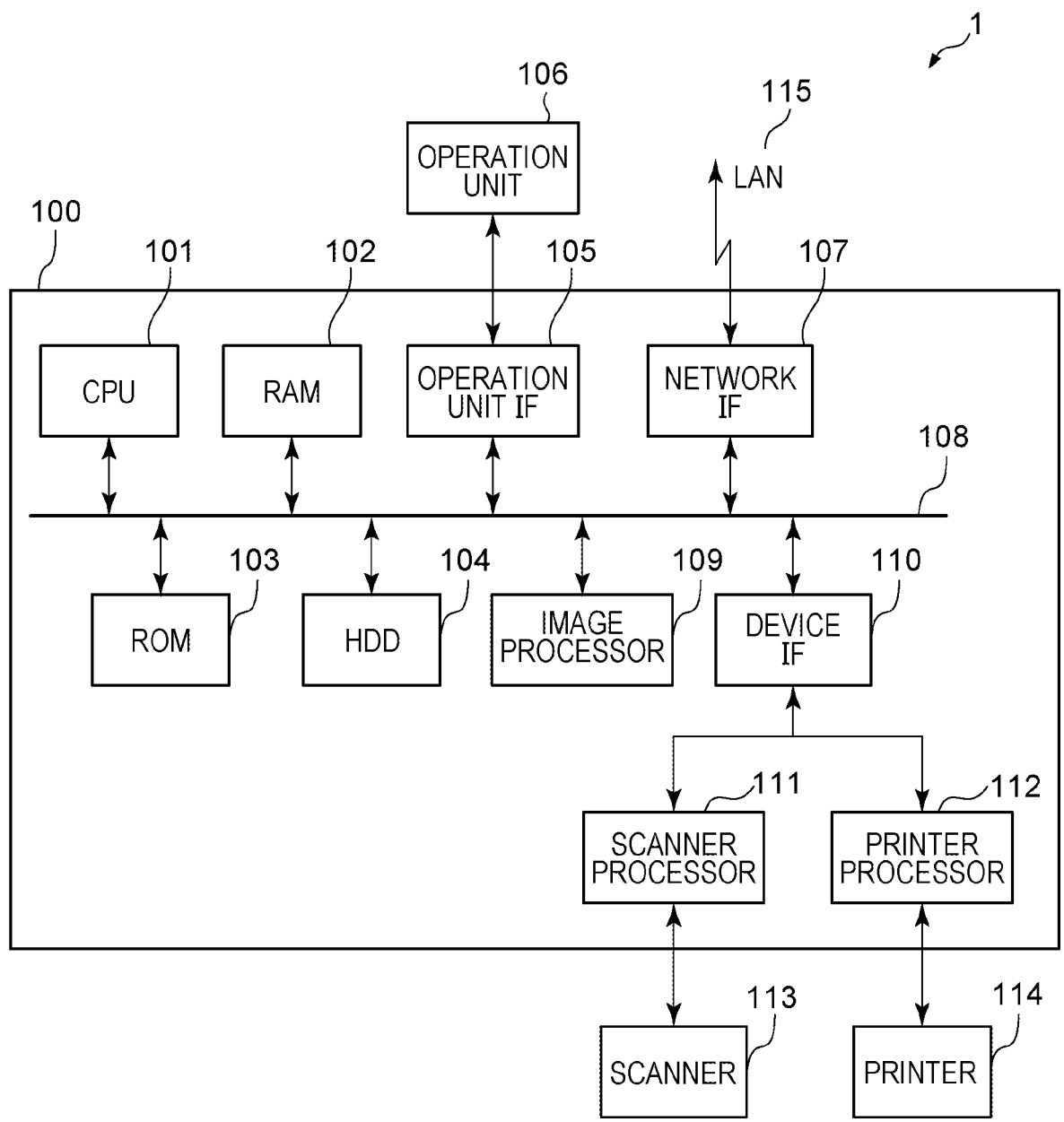
FIG. 1 is a block diagram illustrating a configuration of an image forming apparatus of an embodiment of the present invention.

FIG. 1 is a block diagram illustrating a configuration of an image forming apparatus 1, which is an example of a data processing apparatus.

In this embodiment, as illustrated in FIG. 1, the image forming apparatus 1 is implemented as a multifunction peripheral (MFP) in which a plurality of functions including a scan function and a print function are integrated.

The image forming apparatus 1 includes a controller unit 100 that controls the apparatus as a whole, a scanner 113, a printer 114, and an operation unit 106.

The scanner 113 is an image input device that optically reads an image of a document set by a user.

The printer 114 is an image output device that prints an image on a recording medium, such as printing paper, on the basis of image data.

The operation unit 106 includes hard keys for receiving user operations and a touch panel. The hard keys include, for example, a start key for receiving a job execution instruction and a numeric keypad for setting the number of copies. The touch panel is formed of a liquid crystal display on which a touch panel sheet is laminated, and displays a copy setting screen, a transmission setting screen, apparatus information, and a job progress state. The touch panel receives user operations.

The scanner 113 and the printer 114 are respectively connected to a scanner processor 111 and a printer processor 112 included in the controller unit 100.

The operation unit 106 is connected to an operation unit interface (IF) 105 included in the controller unit 100. The scanner processor 111, the printer processor 112, and the operation unit 106 are controlled by the controller unit 100 and operate.

The controller unit 100 includes a central processing unit (CPU) 101 that centrally controls the blocks of the controller unit 100. The CPU 101 is connected to a random access memory (RAM) 102, a read-only memory (ROM) 103, a hard disk drive (HDD) 104, the operation unit IF 105, and a network IF 107 via a system bus 108. The ROM 103 stores various programs that are read by the CPU 101. The RAM 102 is a general-purpose RAM and is a memory for providing a work area of the CPU 101. The RAM 102 is also used as a memory for temporarily storing parameters, set data, and so on and as an image memory for storing image data in predetermined units, such as units of pages.

The operation unit IF 105 is an interface for input and output of information to and from the operation unit 106. The operation unit IF 105 outputs display data to the operation unit 106 in response to an instruction from the CPU 101 and transfers information input by the user on the operation unit 106 to the CPU 101.

The network IF 107 is connected to a local area network (LAN) 115, which is a wired or wireless LAN, and enables input and output of information to and from a device on the LAN 115. The network IF 107 is configured so as to be suitable to the LAN 115 and may be configured so as to conform to the Near Field Communication (NFC) for the wireless communication range of about 10 cm. In this case, communication with a portable wireless terminal is performed.

An image processor 109 performs general image processing and, for example, performs a process including enlarging/reducing, rotation, conversion, and so on for image data externally obtained via the LAN 115. The image processor 109 performs a process for converting a page description language (PDL) code received via the LAN 115 to a bitmap image. In a case of output by the printer 114 via the printer processor 112, the image processor 109 performs a process for converting compressed and encoded image data stored in the HDD 104 to a format that can be processed by the printer processor 112.

A device IF 110 is connected to the scanner 113 and the printer 114 via the scanner processor 111 and the printer processor 112 respectively, performs synchronous/asynchronous conversion of image data, and transfers set data, an adjustment value, and so on. The device IF 110 transfers state information about the scanner 113 and the printer 114 to the CPU 101. The state information includes, for example, information about an error, such as a jam, occurring in the scanner 113 or the printer 114.

The scanner processor 111 performs various processes corresponding to a scan function for image data generated by the scanner 113 reading a document, the processes including correction, modification, image area segmentation, scaling, and binarization.

The scanner 113 reads a document set on the platen glass. The scanner 113 may include an automatic document feeder (ADF) that feeds a document including a plurality of pages one page at a time, and may read an image of the fed document.

The scanner 113 includes an open/close sensor that detects opening/closing of the document cover not illustrated, a document sensor that detects the presence or absence of a document, and a size sensor that detects the size of the document. Signals from these sensors are transmitted to the CPU 101 via the scanner processor 111 and the device IF 110, and the CPU 101 detects opening/closing of the document cover, the presence or absence of a document, and the size of the document.

The printer processor 112 performs processes corresponding to a print function for image data to be subjected to print output, the processes including output correction that matches the output characteristics of the printer 114, resolution conversion, and an adjustment of the print position of the image. The printer 114 includes at least one paper cassette for storing printing paper. The printer 114 further includes a toner sensor that detects the presence or absence of a toner, and a paper sensor that detects the remaining amount of paper in each paper cassette. Signals from these sensors are transmitted to the CPU 101 via the printer processor 112 and the device IF 110, and the CPU 101 recognizes the presence or absence of a toner and the remaining amount of paper in the printer 114.

The image forming apparatus 1 may be a scanner without the printer 114.

Figure 2:
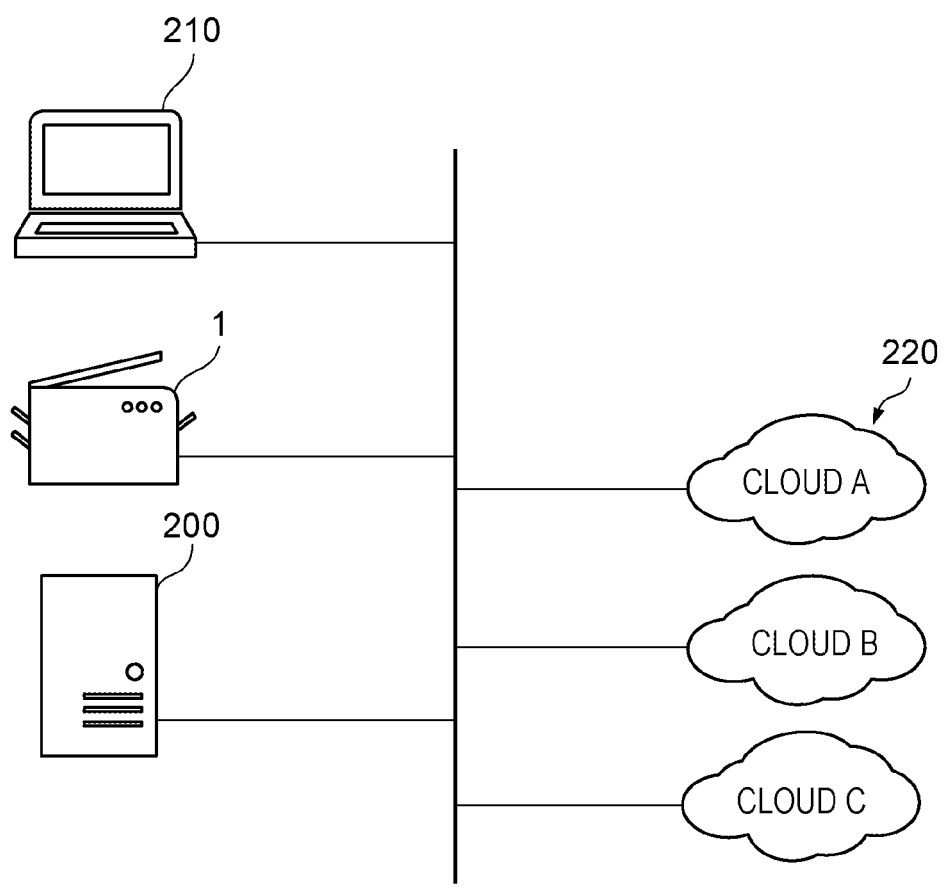
FIG. 2 is a diagram illustrating an example configuration of a data processing system of this embodiment.

FIG. 2 is a diagram illustrating a configuration of a system including a data processing system of this embodiment. The data processing system includes the image forming apparatus 1 and an authentication server 200. The data processing system can communicate with an information processing apparatus 210.

The authentication server 200 provides a function of authenticating a user who uses the image forming apparatus 1 and a function of transmitting image data sent from the image forming apparatus 1 to a cloud service 220.

The authentication server 200 includes a CPU, a ROM, a RAM, a display, an operation unit, and an HDD, receives a command from the information processing apparatus 210, which is, for example, a personal computer (PC), and, for example, registers information about the user of the image forming apparatus 1 and information about the cloud service 220.

The cloud service 220 is a system that executes various functions including a storage service, a character recognition service, and so on in place of the image forming apparatus 1. The storage service is a service in which various types of data including image data and a backup are stored for each user. The use of various types of data stored in the storage service is allowed in response to a login to the storage service by the user. The character recognition service is a service in which image data is received, a character recognition process is performed for the received image data, and the result of character recognition is returned to the apparatus that has transmitted the image data. The system as described above is actually, for example, a server that includes a CPU, a ROM, and a RAM.

The information processing apparatus 210 includes a CPU, a ROM, a RAM, a display, an operation unit, and an HDD, receives user operations, and communicates with the authentication server 200.

The image forming apparatus 1 may be configured so as to enable communication with the information processing apparatus 210 and other PCs.

Figure 3A:
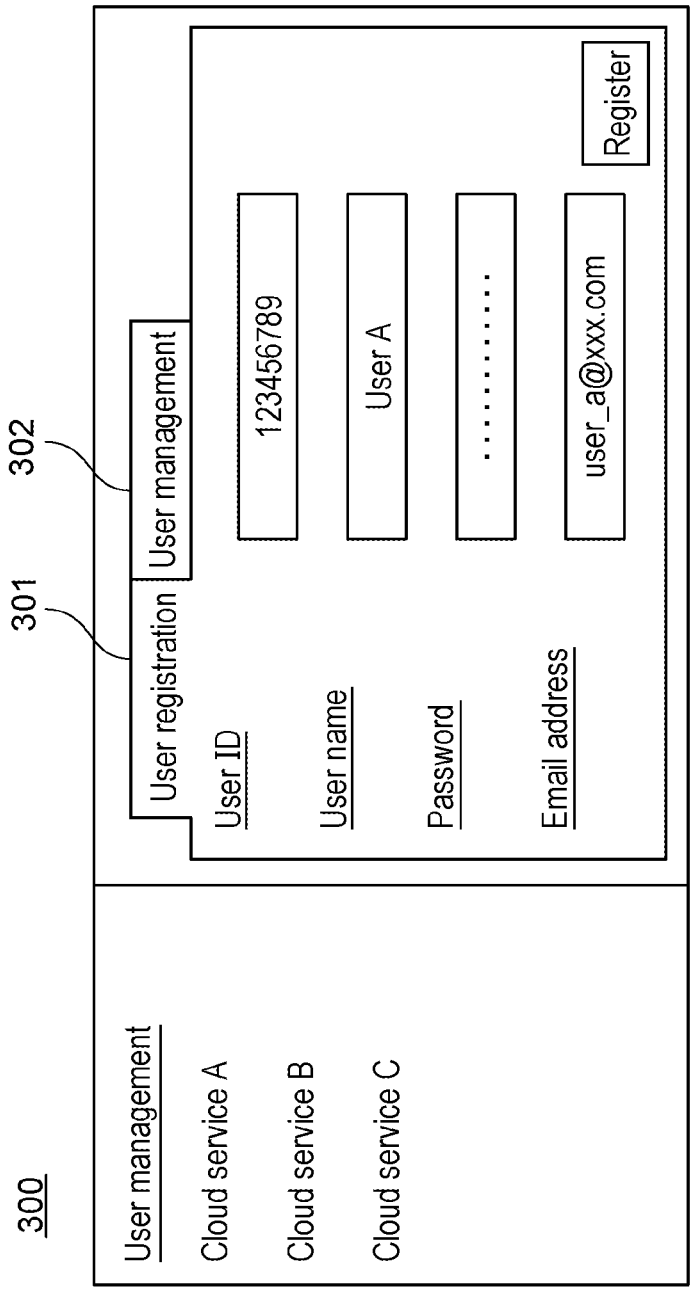
FIG. 3A to FIG. 3C are diagrams illustrating example screens operated in, for example, a web browser of an information processing apparatus of this embodiment.
Figure 3B:
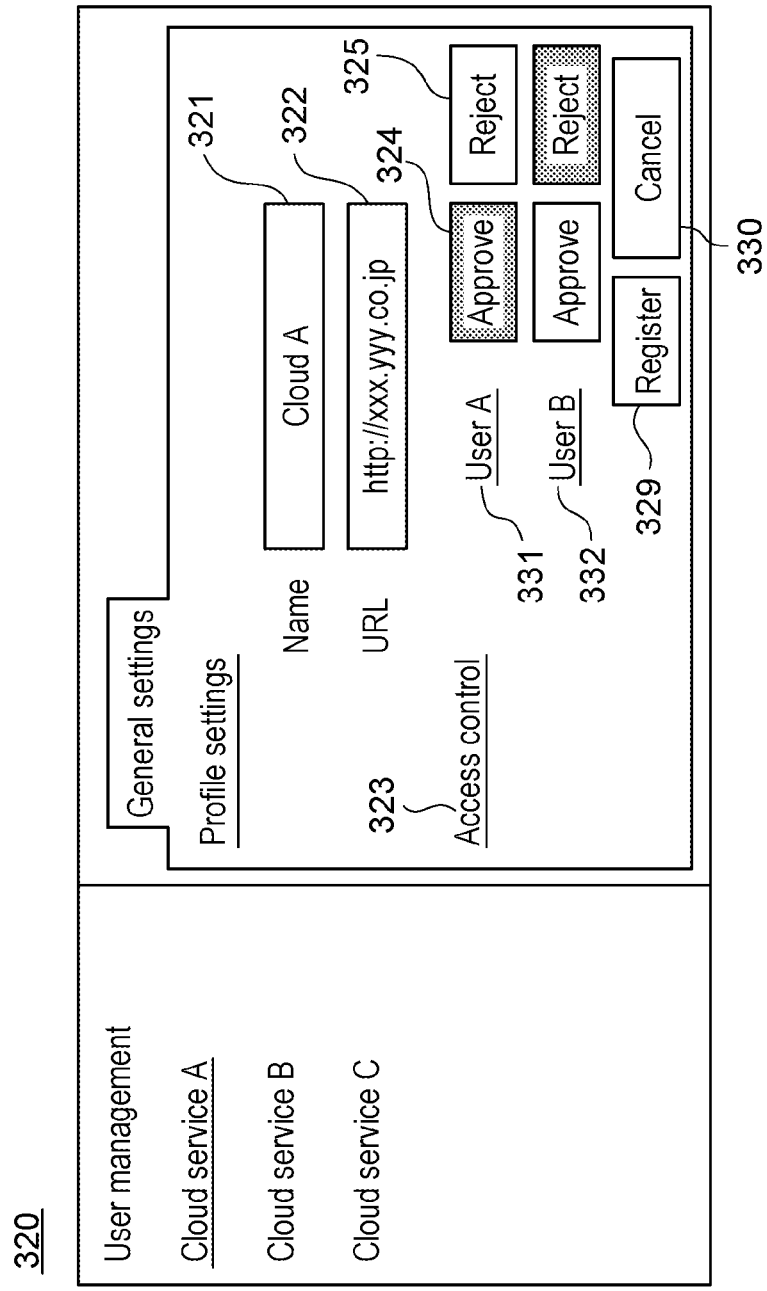

FIG. 3A and FIG. 3B are diagrams illustrating example screens displayed on the display of the information processing apparatus 210. The screen illustrated in FIG. 3A is a screen for the administrator to register in the authentication server 200 a user account of a user who is to use the system. The screen illustrated in FIG. 3B is a screen for registering in the authentication server 200 a new cloud service. The authentication server 200 stores information (for example, a Hypertext Markup Language (HTML) file or an eXtensible Markup Language (XML) file) used to display the screens illustrated in FIG. 3A and FIG. 3B in a storage of the authentication server 200.

The administrator activates a web browser of the information processing apparatus 210 and inputs a specific uniform resource locator (URL) for accessing the authentication server 200 in the URL input field of the web browser. The information processing apparatus 210 accesses the authentication server 200 on the basis of the input URL and receives the information for displaying the screens illustrated in FIG. 3A and FIG. 3B to thereby display the screens illustrated in FIG. 3A and FIG. 3B in the web browser of the information processing apparatus 210.

FIG. 3A illustrates a login user management screen 300 that is displayed in a case where a user registration menu 301 is selected. The administrator uses the login user management screen 300 to register a user ID and a password for the user to log in to the image forming apparatus 1. The administrator further registers the user name and email address of the user. The administrator can use the login user management screen 300 to register the user who logs in to the image forming apparatus 1. The administrator can delete the registered user and change user information by using a user management menu 302. The user may perform the above-described registration in place of the administrator.

FIG. 3B illustrates a cloud service management screen 320 for registering the name of an icon to be displayed on the operation unit 106 of the image forming apparatus 1 and a URL for access by the image forming apparatus 1 when the icon is selected. The name of an icon can be set in a name input field 321. The URL for access by the image forming apparatus 1 when the icon is selected is input to a URL input field 322. An access control menu 323 is a menu for registering, for each user, whether or not to allow access to the cloud service having the name input to the name input field 321 (whether or not to allow the use of the cloud service) by using connection destination information input to the URL input field 322. For each user, an approve button 324 and a reject button 325 are provided. When a register button 329 is selected, the information processing apparatus 210 transmits settings including the result of selection of the approve button 324 or the reject button 325 set on the screen illustrated in FIG. 3B to the authentication server 200, and the authentication server 200 stores the set settings. When a cancel button 330 is selected, the information processing apparatus 210 does not transmit to the authentication server 200 but discards the settings set on the screen illustrated in FIG. 3B.

Figure 3C:
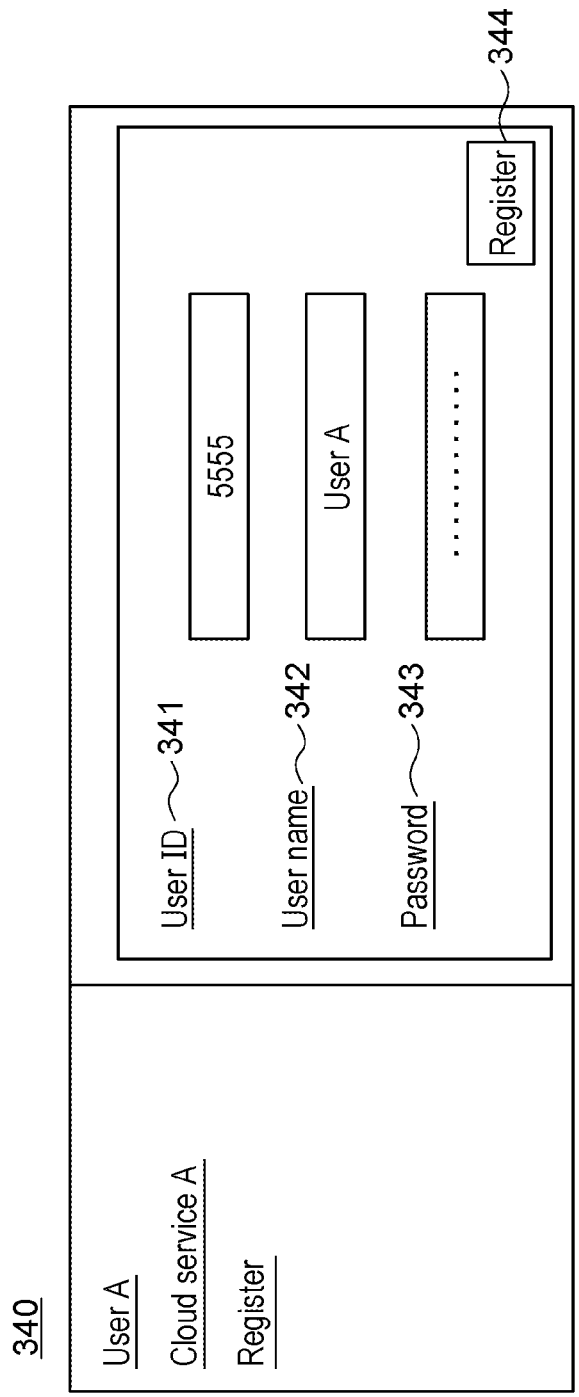

FIG. 3C illustrates a cloud service user registration screen 340 on which an account to be used for a login to the cloud service 220 can be registered. In a case where a URL provided for each user is input to the web browser, the information processing apparatus 210 uses the URL to access the authentication server 200 and displays the screen illustrated in FIG. 3C for registering a user account that is used to log in to a cloud service. Specifically, the screen illustrated in FIG. 3C is a screen for receiving and registering in the authentication server 200 a user ID 341 for a user A to log in to a cloud service A, a user name 342, and a password 343. When these pieces of information are received and a register button 344 is pressed, the authentication server 200 registers the pieces of information in the HDD of the authentication server 200 in association with the user account registered via the screen illustrated in FIG. 3A for a login to the image forming apparatus 1. The user registered in the memory is displayed in the access control menu 323 of the cloud service management screen 320 illustrated in FIG. 3B. On the screen illustrated in FIG. 3B, the user A 331 and a user B 332 are displayed.

FIG. 4 illustrates an example of management information for each user including transmission destination information 400 stored in the HDD of the authentication server 200 of this embodiment. Various types of information are stored on the basis of the settings set by using the screens illustrated in FIG. 3A to FIG. 3C.

The user ID, user name, and password are used for the user to log in to the image forming apparatus 1, and settings input on the screen illustrated in FIG. 3A are stored. The email address input on the screen illustrated in FIG. 3A may be managed for each user in this table.

As the cloud service A, access restriction indicating whether to approve or reject the use of the cloud service A is stored for each user. The setting set in the access control menu 323 of the screen illustrated in FIG. 3B is set.

The user ID for A and the password for A are used for the authentication server 200 to log in to the cloud service A, and the settings set via the screen illustrated in FIG. 3C are set.

Similarly to the cloud service A, data of the similar items are stored for each user for a cloud service B and a cloud service C.

For a cloud service that is newly registered and for which approve/reject for each user is not yet set, information indicating "non-registered" is stored.

The management information can be changed in accordance with an operation from the information processing apparatus 210 and is referred to and used at the time when a user logs in to the image forming apparatus 1 or at the time when data is transmitted from the image forming apparatus 1 to a cloud service.

Figure 5A:
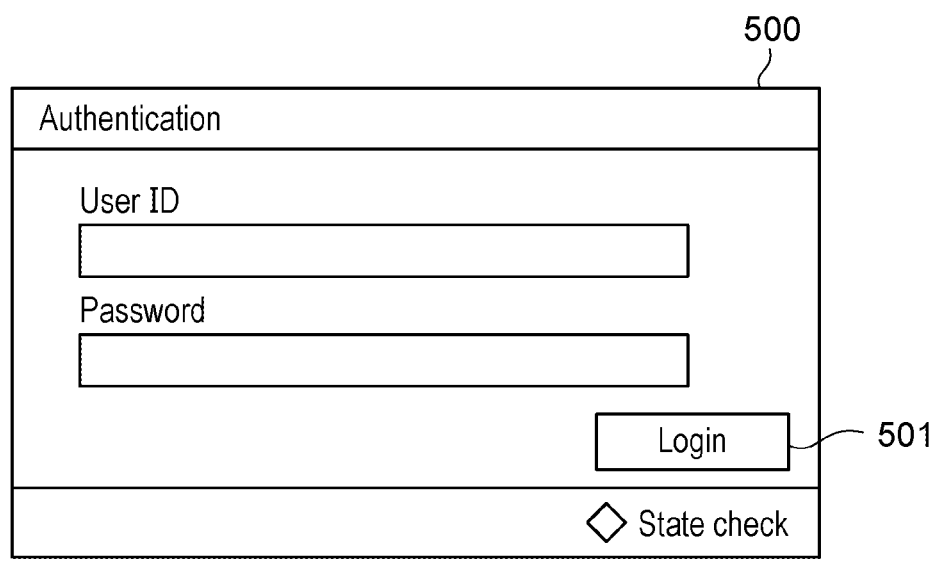
FIG. 5A and FIG. 5B are diagrams illustrating example screens displayed on an operation unit of the image forming apparatus of this embodiment.
Figure 5B:
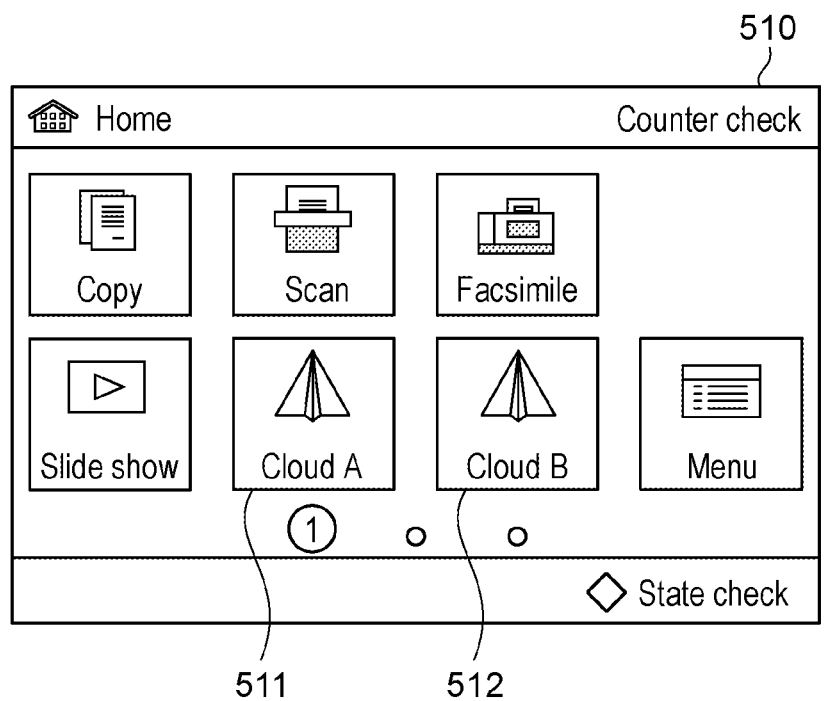

FIG. 5A and FIG. 5B are diagrams illustrating example screens displayed on the operation unit 106 of the image forming apparatus 1 of this embodiment. When a user performs an operation on an authentication screen 500 illustrated in FIG. 5A to input their user ID and password and press a login button 501, the image forming apparatus 1 transmits an authentication request including the user ID and password to the authentication server 200. When the user is successfully authenticated by the authentication server 200, the image forming apparatus 1 receives authentication information (credential) and the transmission destination information 400 from the authentication server 200 and displays a function selection screen illustrated in FIG. 5B on the operation unit 106. Cloud transmission icons 511 and 512 that correspond to the cloud service 220, that is, the cloud services A and B for which information indicating "approve" and information indicating "non-registered" are respectively set as the access restriction in the transmission destination information 400 illustrated in FIG. 4 are displayed. For the cloud service 220 for which information indicating "reject" is set as the access restriction in the transmission destination information 400 illustrated in FIG. 4, no cloud transmission icon is displayed.

The transmission icon is an example of a transmission object and may be displayed in another form, such as the form of a transmission list.

Figure 6A:
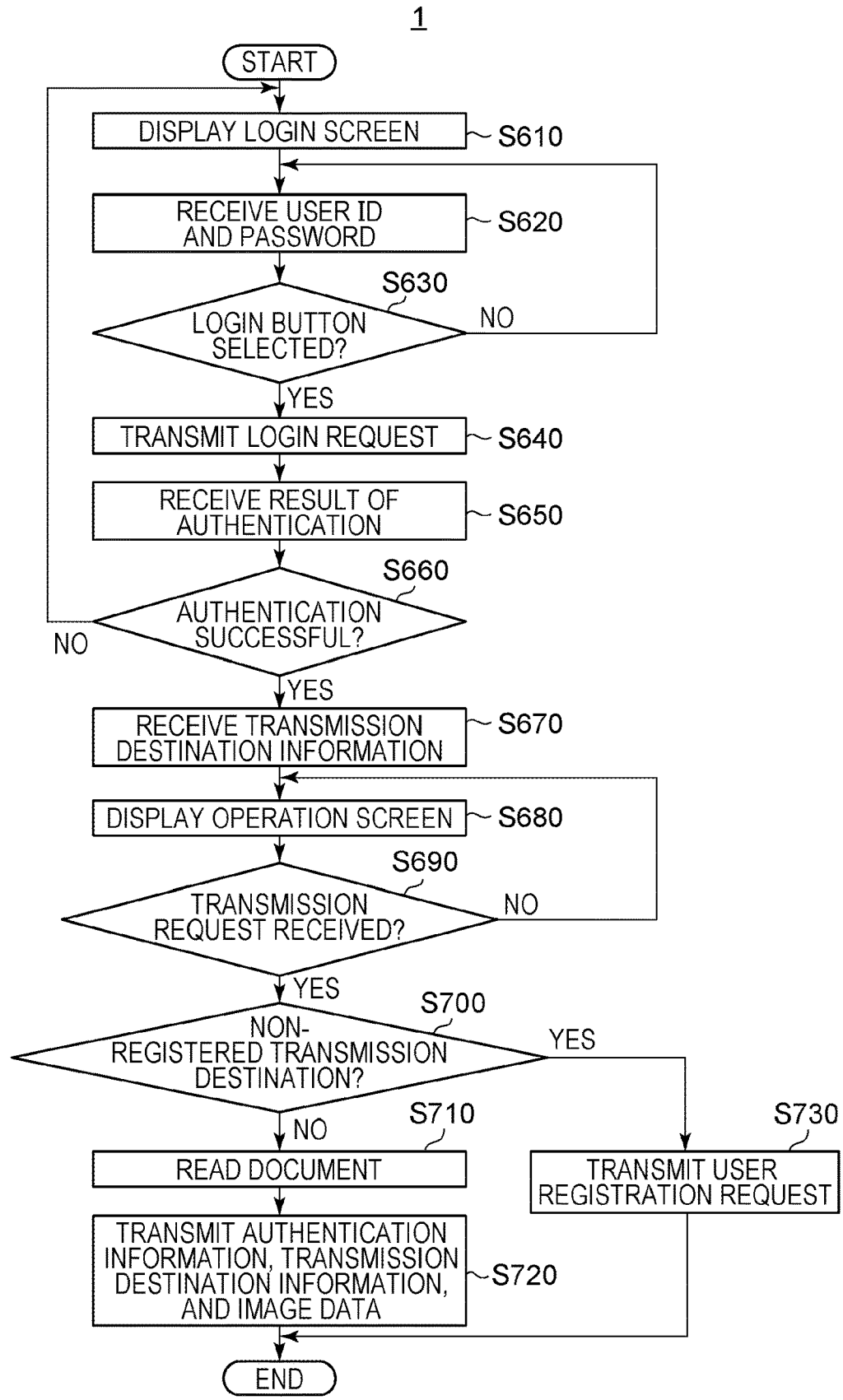
FIG. 6A and FIG. 6B are flowcharts of operations that are performed in the data processing system of this embodiment.
Figure 6B:
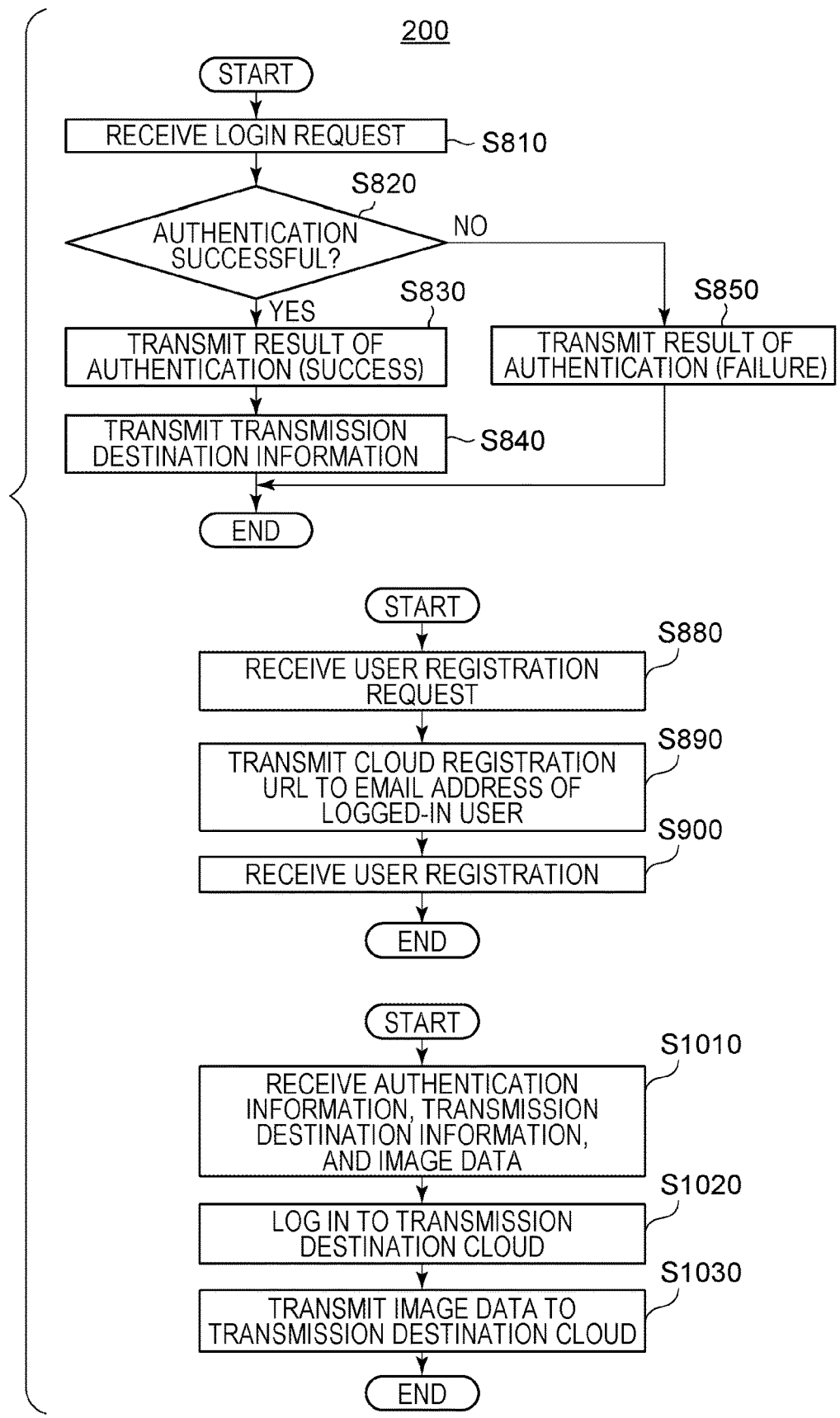

FIG. 6A and FIG. 6B are flowcharts for respectively describing the operations of the image forming apparatus 1 and the authentication server 200 of this embodiment. The process from S610 to S730 in FIG. 6A is implemented by the CPU 101 of the image forming apparatus 1 loading a program stored in the ROM 103 to the RAM 102 and executing the program. The process from S810 to S1030 in FIG. 6B is implemented by the CPU of the authentication server 200 loading a program stored in the ROM of the authentication server 200 to the RAM of the authentication server 200 and executing the program.

In S610, the CPU 101 displays the login screen illustrated in FIG. 5A on the operation unit 106. In S620, the CPU 101 receives a user ID and a password from the user via a keyboard not illustrated. In this embodiment, the example case where the user ID and password are received via a keyboard is described; however, the user ID and password may be read by a card reader (not illustrated) of the image forming apparatus 1 from a card owned by the user. In S630, the CPU 101 determines whether the login button 501 is selected. In a case where the CPU 101 determines that the login button 501 is not selected, the flow returns to S620. On the other hand, in a case where the CPU 101 determines that the login button 501 is selected, the flow proceeds to S640. In S640, the CPU 101 performs a process for transmitting a login request and the user ID and password received in S620 to the authentication server 200.

In S810, the authentication server 200 receives the login request and the user ID and password from the image forming apparatus 1.

In S820, the CPU of the authentication server 200 compares the received user ID and password with user IDs and passwords registered in advance via the screen illustrated in FIG. 3A and managed in the table illustrated in FIG. 4 to authenticate the user. In a case where a user ID and a password that match the received user ID and password are managed in the table illustrated in FIG. 4, the user authentication is successful. On the other hand, in a case where a user ID and a password that match the received user ID and password are not managed in the table illustrated in FIG. 4, the user authentication fails. In a case where the authentication is successful, the flow proceeds to S830. In a case where the authentication fails, the flow proceeds to S850.

In a case where the flow proceeds to S850, the CPU of the authentication server 200 transmits the result of authentication indicating failure to the image forming apparatus 1. In a case where the flow proceeds to S830, the CPU of the authentication server 200 transmits the result of authentication indicating success to the image forming apparatus 1. In S840, the CPU of the authentication server 200 identifies the user who is to use the image forming apparatus 1 on the basis of the user ID and transmits the name and URL of a cloud service for which use by the identified user is approved to the image forming apparatus 1 as transmission destination information. The CPU of the authentication server 200 transmits a user ID and a password for a login to the cloud service. At this time, the name and URL of a cloud service for which "reject" is set on the screen illustrated in FIG. 3B are not transmitted to the image forming apparatus 1.

In S650, the image forming apparatus 1 receives the result of authentication from the authentication server 200.

In S660, the CPU 101 determines whether the result of authentication indicating success is transmitted. In a case where the CPU 101 determines that the result of authentication indicating success is transmitted, the flow proceeds to S670. In a case where the CPU 101 determines that the result of authentication indicating success is not transmitted, the flow returns to S610.

In S670, the image forming apparatus 1 receives the transmission destination information transmitted by the authentication server 200 in S840. In S680, the CPU 101 displays the operation screen illustrated in FIG. 5B on the operation unit 106. FIG. 5B illustrates an example screen to be displayed when the user A logs in to the image forming apparatus 1. According to FIG. 4, for the user A, the use of the cloud service A is approved, "approve" or "reject" is not yet registered for the cloud service B, and the use of the cloud service C is rejected. Accordingly, as illustrated in FIG. 5B, the name and URL of the cloud service A and the name and URL of the cloud service B are transmitted to the image forming apparatus 1 from the authentication server 200. The name and URL of the cloud service C are not transmitted. When receiving the name and URL of the cloud service A and the name and URL of the cloud service B, the CPU 101 performs control as follows. The CPU 101 displays the icon 511 for transmitting image data to the cloud service A and the icon 512 for transmitting image data to the cloud service B on a home screen 510. The home screen 510 is the function selection screen that includes a copy object (the icon named "copy" in FIG. 5B) for selecting the copy function of the image forming apparatus 1 and a transmission object (the icon named "scan" in FIG. 5B) for selecting the data transmission function thereof for scanning a document and transmitting image data generated by scanning the document. The name and URL of the cloud service C are not transmitted, and therefore, no icon for transmitting image data to the cloud service C is displayed.

In S690, the CPU 101 determines whether the icon 511 or the icon 512 on the screen illustrated in FIG. 5B indicating the cloud service is selected. In a case where the CPU 101 determines that the icon 511 or the icon 512 is not selected, the flow returns to S680. In a case where the CPU 101 determines that the icon 511 or the icon 512 is selected, the flow proceeds to S700.

In S700, the CPU 101 determines whether the approval state corresponding to the selected icon is "non-registered". In a case where the CPU 101 determines that the approval state is "non-registered", the flow proceeds to S730. In a case where the CPU 101 determines that the approval state is not "non-registered", the flow proceeds to S710.

In S710, the CPU 101 controls the scanner 113 to make the scanner 113 read the document. In response to an instruction from the CPU 101, the scanner 113 reads the document and generates image data of the read document. In S710, before the document is read, a screen for receiving, from the user, settings for reading the document is displayed, and the document is read in accordance with the received settings for reading.

In S720, the CPU 101 performs control to transmit authentication information (user ID and password) for the selected cloud service, the URL of the selected cloud service, and the image data generated in S710 to the authentication server 200.

In S1010, the authentication server 200 receives the authentication information (user ID and password) for the selected cloud service, the URL of the selected cloud service, and the image data generated in S710 from the image formula apparatus 1.

In S1020, the authentication server 200 accesses the cloud service indicated by the received URL and transmits the received authentication information (user ID and password) to the cloud service to log in to the cloud service. In S1030, the CPU of the authentication server 200 transmits the image data received in S1010 to the cloud service to which the authentication server 200 is logged in. The cloud service receives the image data and stores the received image data in a memory area for the user indicated by the received user ID.

In a case where the flow proceeds from S700 to S730, in S730, the CPU 101 transmits a user registration request to the authentication server 200.

In S880, the authentication server 200 receives the user registration request form the image forming apparatus 1.

In S890, the authentication server 200 transmits a URL for registering the cloud service to the email address of the logged-in user registered via the screen illustrated in FIG. 3A.

In S900, the authentication server 200 receives, from the user making access by using the URL, user registration in the cloud service.

With the above-described embodiment, even in a case where the number of cloud services that can be used increases, the possibility of a user selecting a wrong transmission destination can be reduced and the inconvenience of taking a long time to select a transmission destination can be reduced.

In the above-described embodiment, the example case where settings for reading the document are received in S710 is described. Alternatively, on the screen illustrated in FIG. 3B, settings for reading documents may be received for each cloud service, the settings for reading may be kept in the table illustrated in FIG. 4 for each cloud service, and the document may be read in accordance with the settings for reading.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-224132 filed Nov. 29, 2018, which is hereby incorporated by reference herein in its entirety.

What is claimed is:

1. A data processing system comprising:
a communicator that communicates with a cloud server that provides a cloud service, wherein the communicator transmits image data to the cloud server;
a controller that receives a setting related to permission of use of the cloud service by an authenticated user; and
a storage that stores information that indicates a state related to permission or prohibition of use of the cloud service by the authenticated user,
wherein, in a case that the controller receives a setting for permitting use of the cloud service by the authenticated user, the storage stores information that indicates that use of the cloud service by the authenticated user is permitted,
wherein, in a case that the controller receives a setting for prohibiting use of the cloud service by the authenticated user, the storage stores information that indicates that use of the cloud service by the authenticated user is prohibited, and
wherein, in a case that the controller does not receive the setting related to permission or prohibition of use of the cloud service by the authenticated user, the storage stores information that indicates that use of the cloud service by the authenticated user is neither permitted nor prohibited.

2. The data processing system according to claim 1, wherein, in a case that the controller does not receive the setting related to permission or prohibition of use of the cloud service by the authenticated user and information of the cloud service is registered, the storage stores information that indicates that use of the cloud service by the authenticated user is neither permitted nor prohibited.

3. The data processing system according to claim 1, wherein the storage stores, for each user, the information that indicates the state related to permission or prohibition of use of the cloud service.

4. The data processing system according to claim 1, further comprising
a scanner that scans a document,
wherein the communicator transmits the image data generated by scanning the document by the scanner to the cloud server.

5. The data processing system according to claim 1, wherein
the controller authenticates a user.

6. The data processing system according to claim 1, further comprising
a display that displays an object for using the cloud service on a home screen.

7. The data processing system according to claim 6, wherein
the display displays the object together with a copy object for selecting a copy function and a transmission object for selecting a data transmission function.

8. The data processing system according to claim 6, wherein
the display does not display the object in a case where use, by the authenticated user, of the cloud service is prohibited.

9. A control method for a data processing system comprising a communicator that communicates with a cloud server that provides a cloud service, the control method comprising:
receiving a setting related to permission of use of the cloud service by an authenticated user; and
storing information that indicates a state related to permission or prohibition of use of the cloud service by the authenticated user,
wherein, in a case that a setting for permitting use of the cloud service by the authenticated user is received, information that indicates that use of the cloud service by the authenticated user is permitted is stored,
wherein, in a case that a setting for prohibiting use of the cloud service by the authenticated user is received, information that indicates that use of the cloud service by the authenticated user is prohibited is stored, and
wherein, in a case that the setting related to permission or prohibition of use of the cloud service by the authenticated user is not received, information that indicates that use of the cloud service by the authenticated user is neither permitted nor prohibited is stored.

10. A non-transitory computer-readable storage medium storing a program for causing a computer to perform a control method for a data processing system comprising a communicator that communicates with a cloud server that provides a cloud service, the control method comprising:

receiving a setting related to permission of use of the cloud service by an authenticated user; and storing information that indicates a state related to permission or prohibition of use of the cloud service by the authenticated user, wherein, in a case that a setting for permitting use of the cloud service by the authenticated user is received, information that indicates that use of the cloud service by the authenticated user is permitted is stored, wherein, in a case that a setting for prohibiting use of the cloud service by the authenticated user is received, information that indicates that use of the cloud service by the authenticated user is prohibited is stored, and wherein, in a case that the setting related to permission or prohibition of use of the cloud service by the authenticated user is not received, information that indicates that use of the cloud service by the authenticated user is neither permitted nor prohibited is stored.

* * * * *